Dec. 12, 1944.  L. HAMMOND  2,364,972
BANK AND TURN INDICATOR
Filed June 20, 1942
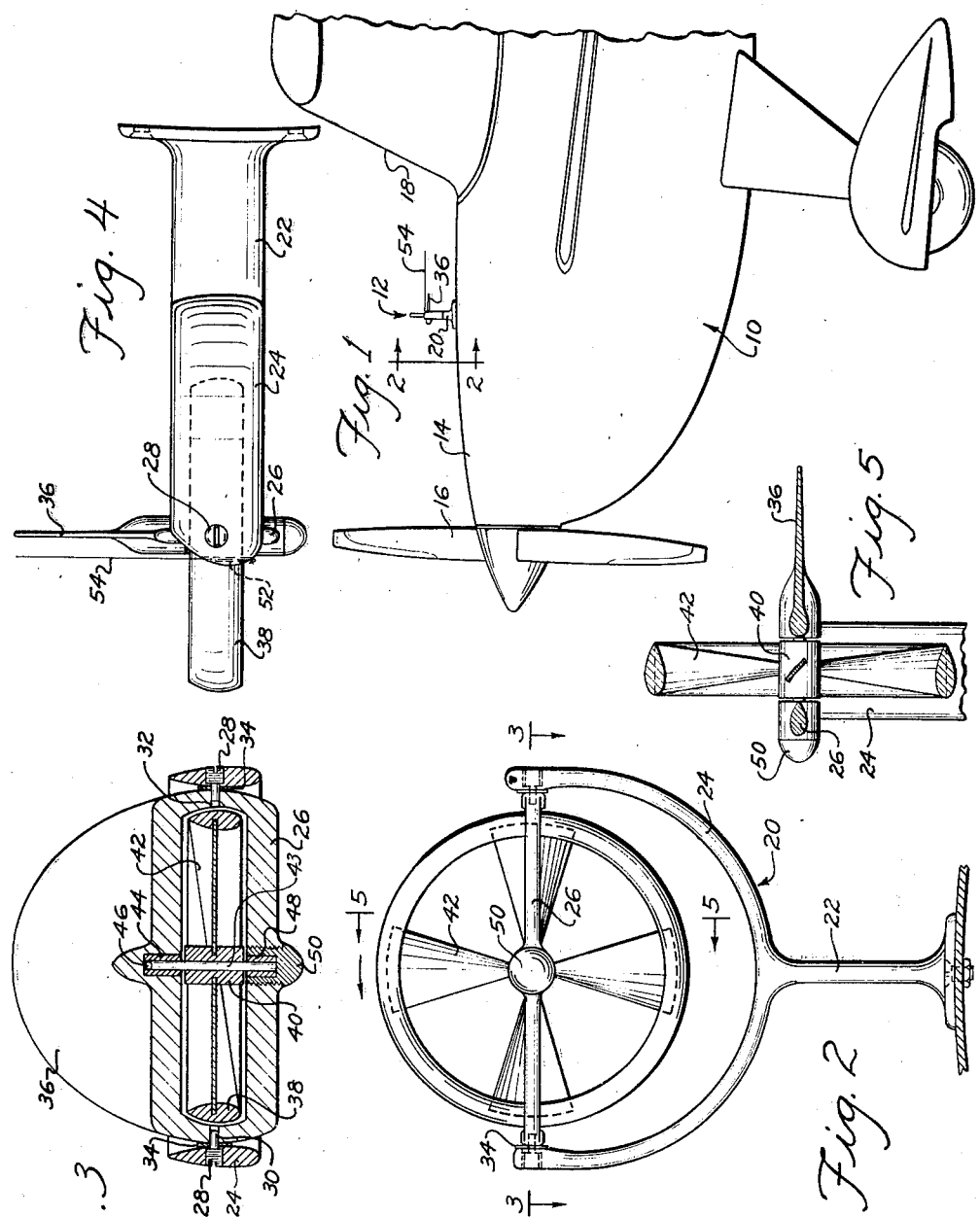
Inventor
Laurens Hammond
By Benjamin F. Nupper
Atty.

Patented Dec. 12, 1944

2,364,972

UNITED STATES PATENT OFFICE 2,364,972

BANK AND TURN INDICATOR

Laurens Hammond, Chicago, Ill.

Application June 20, 1942, Serial No. 447,878

3 Claims. (Cl. 33—204)

My invention relates generally to navigating instruments, and more particularly to bank and turn indicators for airplanes. The instruments available in the past to indicate to the pilot of an airplane that his plane was making a turn, have been relatively complicated and so costly as to make prohibitive their use on small planes.

It is an object of my invention to provide an extremely simple yet effective bank and turn indicator for airplanes which is of such low cost construction that it may be sold at a price permitting its widespread use on small low powered airplanes.

It is a further object of my invention to provide an improved bank and turn indicator for airplanes employing a gyro, and in which the air stream past the plane is utilized as the motive power for the gyro, and also to provide a restoring force.

A further object is to provide a bank and turn indicator for airplanes which may be constructed mainly of die-castings and stampings, and may thus be economically manufactured.

Other objects of the invention will appear from the following description, reference being had to the accompanying drawing in which:

Figure 1 is a fragmentary side elevational view of an airplane showing the improved bank and turn indicator mounted thereon;

Figure 2 is a front elevational view of the bank and turn indicator taken on the line 2—2 of Fig. 1;

Figure 3 is a horizontal sectional view thereof taken on the line 3—3 of Fig. 2;

Figure 4 is a side elevational view; and

Figure 5 is a fragmentary transverse sectional view taken on the line 5—5 of Fig. 2.

Referring to Figure 1, an airplane 10 has a bank and turn indicator 12 mounted on the upper surface of the cowl 14 so as to lie within the slip stream of the propeller 16, or in any event, in the stream of air passing the plane. Indicator 12 is located directly in front of the windshield 18 and in front of the pilot's seat, so that it is clearly visible to him.

The bank and turn indicator comprises a bifurcated standard 20 which may be suitably secured to the cowl 14. The pedestal portion 22 of the standard 20, as well as its arms 24, are of air foil section, and the standard as a whole is properly faired so as to produce minimum drag and minimum disturbance to the air stream.

A gyro gimbal 26 is thin in frontal aspect and is likewise streamlined. The pivots for the gimbal 26 are provided by a pair of screws 28 threaded in suitably tapped holes at the upper ends of the arms 24, and have integral pivot pin portions 30 which project into bearing holes or sockets 32 formed in the gimbal 26, these sockets being located in line with the center of gravity of the gimbal ring 26 and the parts carried thereby. A pair of thin washers 34 may be utilized to reduce the bearing friction between the gimbal ring 26 and the arms 24. A restoring vane 36 is formed integrally with the gimbal 26, being of thin section and forming a faired extension of the rear cross bar of the gimbal 26.

The gyro 38 is preferably formed by die-casting, and has a relatively heavy rim of air foil cross section, the rim being connected to a central hub 40 by a plurality of spokes 42 which are in the form of fan or impeller blades. These blades 42 may be cast as inserts in the rim of the gyro, and are suitably secured to the hub 40. A pin or axle 43 is fixed in the hub 40 and has its rearward end projecting into a suitable bearing sleeve 44 within which is located a thrust ball bearing 46. The forward end of the axle 43 projects into a bearing sleeve 48 which is secured in a cap nut 50 threaded in the gimbal 26. The bearing sleeves 44 and 48 are preferably of the oil impregnated composition type. The axle 43 is of minimum diameter compatible with its necessary strength so that the gyro 38 may spin very freely.

The upper end of one of the arms 24 of the standard 20 is provided with a horizontal drilled hole 52 adapted to receive a length of string or thread 54, the end of which is knotted, the string 54 trailing in the air stream and by its position providing a rough indication of side slip of the plane.

When an air stream flows past the bank and turn indicator the gyro 38 will be spun, and in normal flight the speed of rotation will be sufficiently high that the gyro will exhibit a very substantial gyroscopic effect. The shape of the blades 42 is made such that nearest maximum speed of rotation of the gyro is obtained when the air stream flows past it at the velocity attained during normal cruising of the airplane.

The air stream, in flowing past the restoring vane 36, applies a substantial force tending to maintain the axis of the gyro in a plane parallel with the general direction of air flow, and unless the plane is executing a turn, the gyro will continue rotation with its axis in this position as shown in the drawing. However, when the plane commences the execution of a turn, the gyro will precess, and, assuming that the gyro spins counterclockwise (Fig. 2), will rotate about the axis of the bearing pins 30 counterclockwise (Figs. 1 and 4) when the plane is turning toward the right, and will rotate in the opposite direction when the airplane is executing a turn to the left. For greater ease in observing the direction in which the gyro is precessing, the vane 36 may have its upper and lower surfaces finished in contrasting colors.

It will be understood that as long as the plane continues executing a turn, the gyro and gimbal will tend to remain precessed from their normal positions, since the gyroscopic torque, or forces causing such precession, are far greater than the air pressure forces applied to the restoring vane 36. When, however, the turn is completed and the airplane resumes a straight course, the differential air pressure on the two surfaces of the vane 36 will cause the gyro to be restored to its normal position and kept in this position, with the gyro axis in a plane parallel to the general direction of air flow.

Since the supporting standard 20, the gimbal 25 and the gyro 38 may be formed by die-casting, it will be apparent that the instrument may be manufactured at a very low cost. In order further to reduce the cost of manufacture, the spokes or blades 42 and hub 40 may be cast integrally with the rim of the gyro, with the axle 43 cast as an insert. By using this method the blades 42 may be of proper contour to offer a minimum of resistance to the spinning of the gyro.

The vane 36 forms a practical simple means for applying the gyroscopic torque for restoring the gyro to normal from its precessed position. It will be understood, however, that the vane may be omitted and a spring substituted therefor, the spring being arranged to be effective to restore the gimbal 26 to normal horizontal position when displaced therefrom in either direction.

While I have shown and described a particular embodiment of my invention, it will be apparent to those skilled in the art that numerous variations and modifications may be made without departing from the fundamental principles of the invention. I therefore desire, by the following claims, to include within the scope of my invention, all such variations and modifications by which substantially the results of the invention may be obtained by the use of substantially the same or equivalent means.

I claim:

1. In a turn and bank indicator for an aircraft, the combination of a forked supporting member adapted to be rigidly secured to an aircraft in the air stream thereof and wholly externally of the aircraft at a point at which it is visible from the pilot's seat, a gimbal mounted on said member for rotary movement about a normally horizontal axis extending transversely of the aircraft, said gimbal having a thin trailing vane portion normally tending to maintain the gimbal in a generally horizontal plane, and a gyro mounted for rotation in said gimbal, said gyro having surfaces acted upon by the air stream flowing past the aircraft for rotating it at high speed.

2. A direct indicating turn and bank indicator for aircraft comprising, a gyro having a heavy rim of streamlined cross-section and spokes conformed to impart spinning motion thereto upon movement relative to the air, a support having means for securing it rigidly to an external surface of the aircraft in the air stream and in a position where it may readily be observed by the pilot, a gimbal mounted for rotary movement in said support about a normally horizontal axis transverse to the axis of the aircraft, and means responsive to the flow of air past the indicator to provide a force acting upon said gimbal and biasing the latter to hold the gyro spin axis parallel to the direction of flow of air past it.

3. A turn and bank indicator for aircraft comprising, a gyro, a gimbal for supporting said gyro for rotation, and a standard adapted to be fixed to an airplane to project from the external surface thereof into the air stream at a position where it may readily be observed by the pilot, said standard providing a rotary mounting for said gimbal on an axis perpendicular to the gyro axis and transversely of the axis of the aircraft, said gyro having impeller means to cause rotation thereof under the influence of the flow of air through and past the gyro, and said gimbal having means actuated by air flow past the instrument to provide a torque opposing precession of the gyro from its normal position.

LAURENS HAMMOND.